(12) United States Patent
Nahas

(10) Patent No.: US 10,408,188 B2
(45) Date of Patent: Sep. 10, 2019

(54) TIDAL POWER GENERATOR

(71) Applicant: Gregory H. Nahas, Foxborough, MA (US)

(72) Inventor: Gregory H. Nahas, Foxborough, MA (US)

(*) Notice: Subject to any disclaimer, the term of this patent is extended or adjusted under 35 U.S.C. 154(b) by 147 days.

(21) Appl. No.: 15/457,190

(22) Filed: Mar. 13, 2017

(65) Prior Publication Data

US 2017/0350365 A1    Dec. 7, 2017

Related U.S. Application Data

(60) Provisional application No. 62/345,166, filed on Jun. 3, 2016.

(51) Int. Cl.
| | | |
|---|---|---|
| *F03B 13/26* | (2006.01) | |
| *F03B 15/00* | (2006.01) | |
| *F03B 13/14* | (2006.01) | |

(52) U.S. Cl.
CPC .......... *F03B 13/262* (2013.01); *F03B 13/144* (2013.01); *F03B 15/00* (2013.01); *F05B 2220/706* (2013.01); *F05B 2240/91* (2013.01); *F05B 2250/231* (2013.01); *F05B 2270/18* (2013.01); *Y02E 10/38* (2013.01)

(58) Field of Classification Search
CPC ...... F03B 13/26; F03B 13/262; F03B 13/268; F03B 13/144; F03B 13/145; F03B 13/147; F03B 15/00; F03B 15/02; F05B 2270/18; F05B 2240/91; F05B 2220/706
See application file for complete search history.

(56) References Cited

U.S. PATENT DOCUMENTS 3,122,889 A * 3/1964 Bonamy ............... F03B 13/262
                                                    405/77

FOREIGN PATENT DOCUMENTS

| DE | 3004828 A1 * | 8/1981 |
| GB | 2482882 A * | 2/2012 |

* cited by examiner

*Primary Examiner* — Mark A Laurenzi
*Assistant Examiner* — Xiaoting Hu
(74) *Attorney, Agent, or Firm* — Lando & Anastasi, LLP

(57) ABSTRACT

Systems and methods disclosed herein provide a tidal power generator including a first container, a second container coupled to the first container, a frame pivotably coupled to the second container, a first valve, associated with the second container, configured to selectively control ingress of a first volume of a fluid into the second container, and a second valve, associated with the second container, configured to selectively control egress of a second volume of the fluid out of the second container.

6 Claims, 10 Drawing Sheets

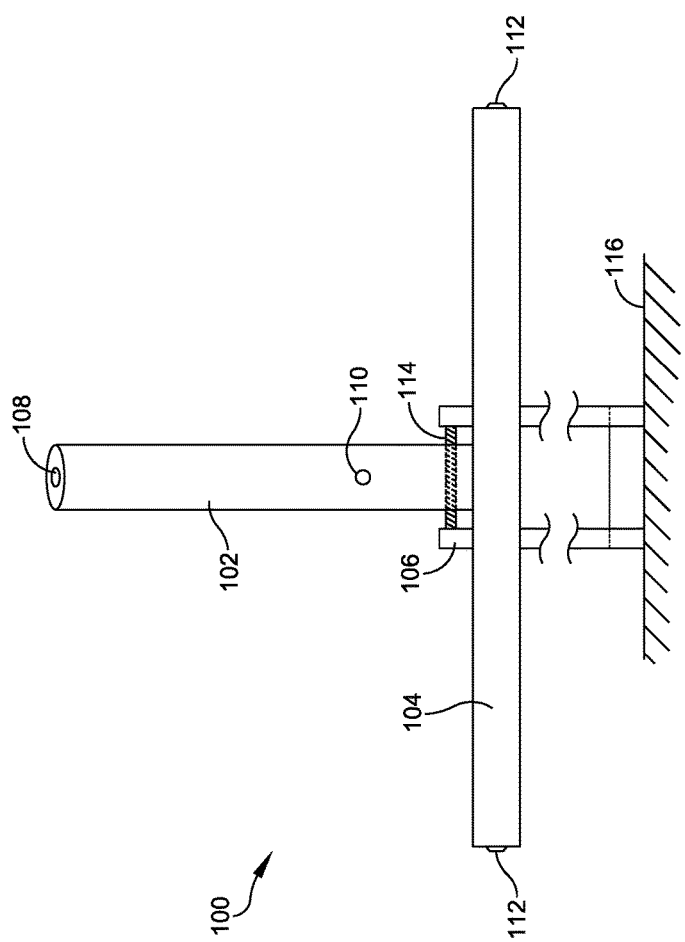

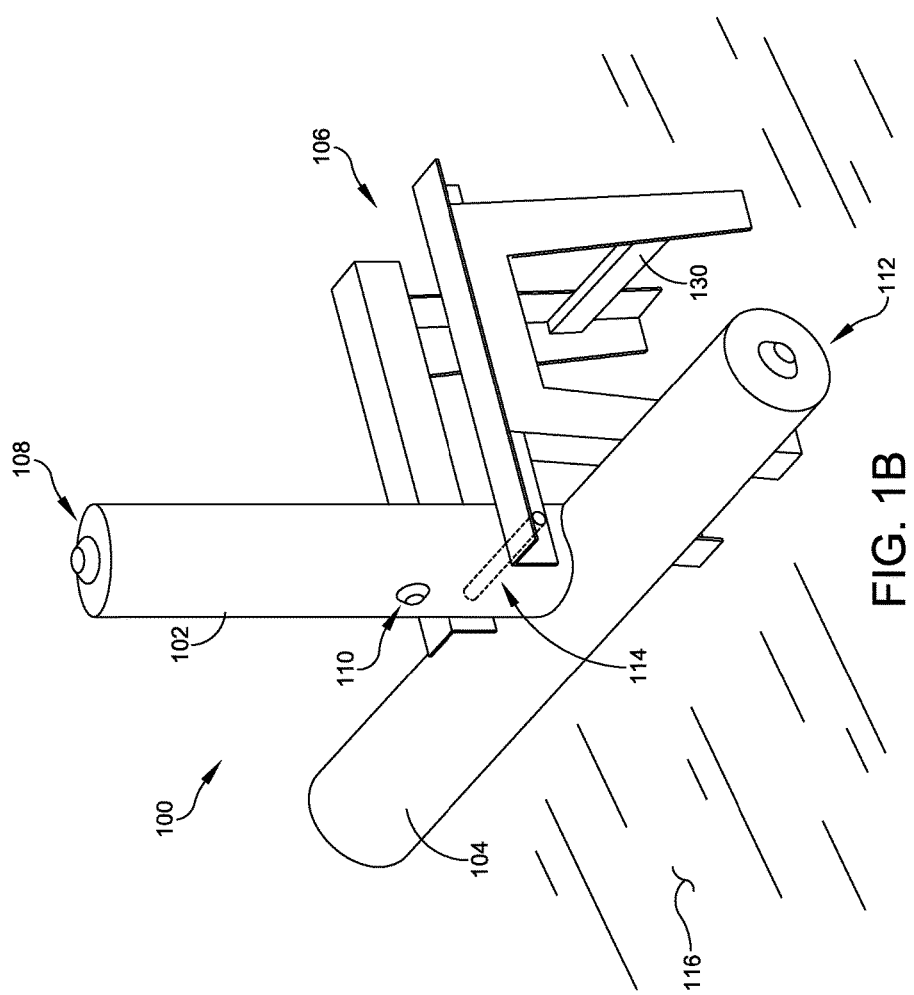

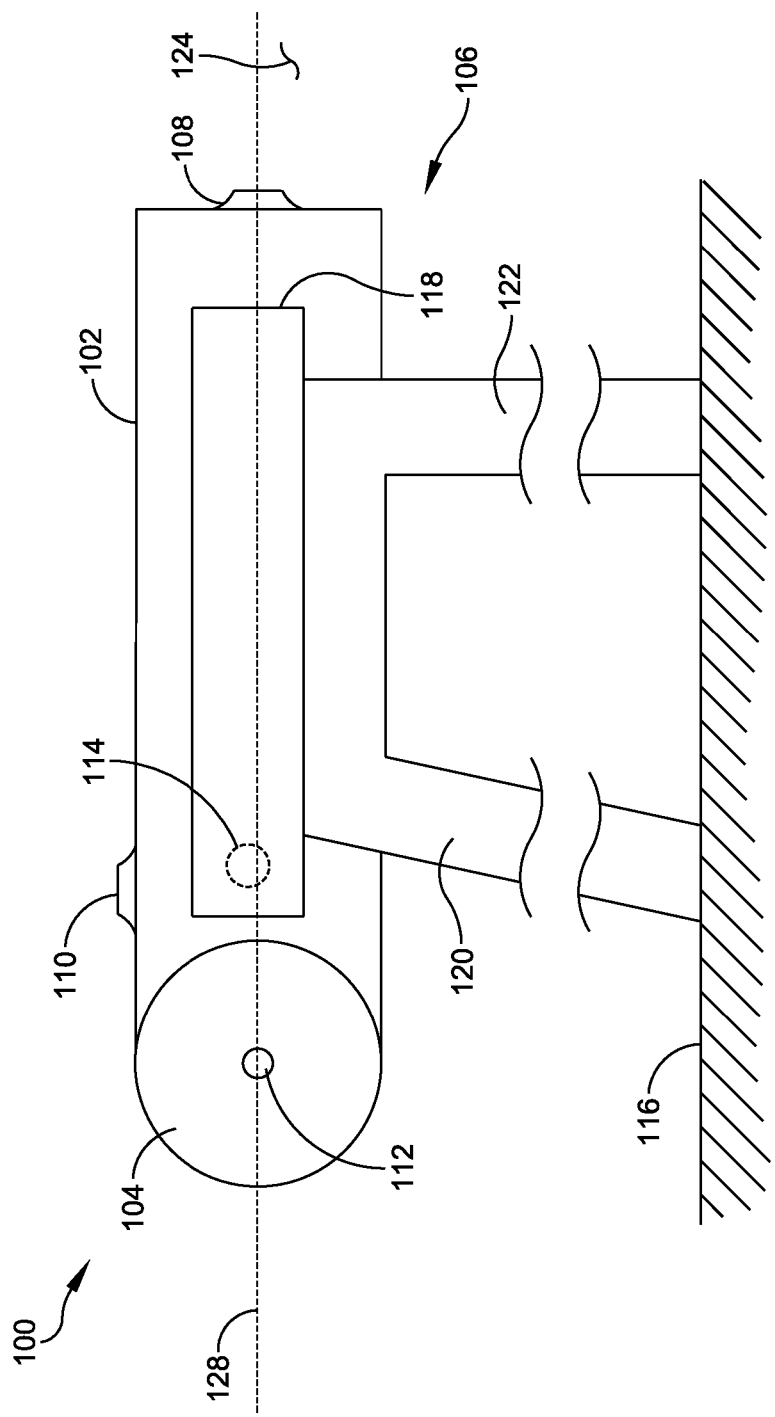

TIDAL POWER GENERATOR

CROSS-REFERENCE TO RELATED APPLICATION

This application claims priority under 35 U.S.C. § 119(e) to U.S. Provisional Application Ser. No. 62/345,166, entitled "TIDAL POWER GENERATOR," filed on Jun. 3, 2016, which is herein incorporated by reference in its entirety.

BACKGROUND

Many power generators operate using energy sources including fossil fuels, such as coal, oil and natural gas. However, the burning of fossil fuels produces harmful emissions and adversely affects animal life, plant life, and the environment. Furthermore, fossil fuels are non-renewable resources and will be depleted in the near future. Alternate, renewable energy sources being leveraged today, including solar energy, wind energy, ocean wave energy and geothermal energy are considered "clean" energy sources, but do not have very reliable energy output capabilities. For example, solar energy cannot be used at night or during cloudy or stormy weather. Wind energy is also not very reliable, as wind energy is dependent on weather conditions. Ocean wave energy depends on erratic wind strength and weather conditions, and geothermal energy is restricted by an extremely limited set of conditions and high initial installation costs. Moreover, harnessing geothermal energy requires drilling into the earth's crust and can result in the release of toxic gases and minerals.

Conversely, ocean tides are highly reliable, cycling once or twice each twenty-four-hour period. Ocean tides are also widely available to most parts of the world, and are a renewable source of clean energy. Existing tidal power generators suffer from various deficiencies, including, for example, prohibitively large construction and maintenance time and costs, harmful environmental impact, an inability to operate over a full range of tidal depths, an inability to operate independently of a normal tidal cycle for an extended period of time (e.g., longer than 12 hours), an inability to elevate water above a natural high tide, and so forth. In light of the foregoing deficiencies, there exists a need for a novel form of renewable energy that is reliable, cost-effective, efficient, environmentally friendly, and capable of operating in most coastal regions.

SUMMARY

Aspects and examples are directed to generating electrical energy using variable water levels. With particular reference to natural tide cycles, the rising and falling action of the tides is used to raise water above a high tide level such that potential energy stored in the raised water may be harnessed to drive a power generator. The ability to raise water above a high tide level provides multiple advantages over existing tidal power generators.

According to one aspect, a tidal power generator is provided. The tidal power generator includes a first container, a second container coupled to the first container, a frame pivotably coupled to the second container, a first valve, associated with the second container, configured to selectively control ingress of a first volume of a fluid into the second container, and a second valve, associated with the second container, configured to selectively control egress of a second volume of the fluid out of the second container.

In one embodiment, the second container is coupled transversely to the first container. In some embodiments, the first container is fluidically decoupled from the second container. According to at least one embodiment, the first container is fluidically coupled to the second container. In one embodiment, the tidal power generator is disposed in a body of the fluid, the body of the fluid having a high fluid level and a low fluid level. In some embodiments, the tidal power generator is configured to raise the first volume of the fluid above the high fluid level.

In some embodiments, the tidal power generator further includes a third valve, associated with the first container, configured to selectively control ingress and egress of a third volume of the fluid into and out of the first container. In one embodiment, the second volume of the fluid is provided to one or more electrical generators to drive the one or more electrical generators. In some embodiments, the tidal power generator further comprises a third container pivotably coupled to the second container. In some embodiments, the first container is pivotably coupled to the second container. In one embodiment, the frame is configured to be coupled to a fixed plane.

According to one embodiment, a method of controlling a tidal power generator disposed in a body of a fluid is provided, the method comprising acts of actuating one or more first valves to control a first amount of fluid in the tidal power generator responsive to the body of the fluid having a first fluid level, opening a second valve to control a second amount of fluid entering the tidal power generator responsive to the body of the fluid having a second fluid level, and opening a third valve to control a third amount of fluid exiting the tidal power generator responsive to the body of the fluid having a third fluid level, the third amount of fluid having a fourth fluid level greater than the third fluid level.

In some embodiments, the first fluid level and the third fluid level represent a low fluid level of the body of the fluid. In one embodiment, the second fluid level represents a high fluid level of the body of the fluid. According to one embodiment, the fourth fluid level is higher than the second fluid level. In at least one embodiment, the method includes acts of providing the third amount of fluid to one or more electrical generators in response to opening the third valve.

In some embodiments, actuating the one or more first valves including controlling the first amount of fluid such that the tidal power generator is configured to rotate in a first direction responsive to the body of the fluid having a rising fluid level, and rotate in a second direction responsive to the body of the fluid having a lowering fluid level. In one embodiment, the first direction is opposite the second direction. In at least one embodiment, actuating the one or more first valves includes controlling a flow of fluid into the tidal power generator. According to one embodiment, actuating the one or more first valves includes controlling a flow of fluid out of the tidal power generator.

Still other aspects, examples, and advantages of these exemplary aspects and examples are discussed in detail below. Examples disclosed herein may be combined with other examples in any manner consistent with at least one of the principles disclosed herein, and references to "an example," "some examples," "an alternate example," "various examples," "one example" or the like are not necessarily mutually exclusive and are intended to indicate that a particular feature, structure or characteristic described may be included in at least one example. The appearances of such terms herein are not necessarily all referring to the same example.

BRIEF DESCRIPTION OF THE DRAWINGS

Various aspects of at least one example are discussed below with reference to the accompanying figures, which are not intended to be drawn to scale. The figures are included to provide illustration and a further understanding of the various aspects and examples, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures:

FIG. 1A is a front view of a first embodiment of a Tidal Power Generator ("TPG");

FIG. 1B is a perspective view of the first embodiment of the TPG;

FIG. 4B is a side view of the first embodiment of the TPG in a high fluid level situation;

DETAILED DESCRIPTION

Figure 2:
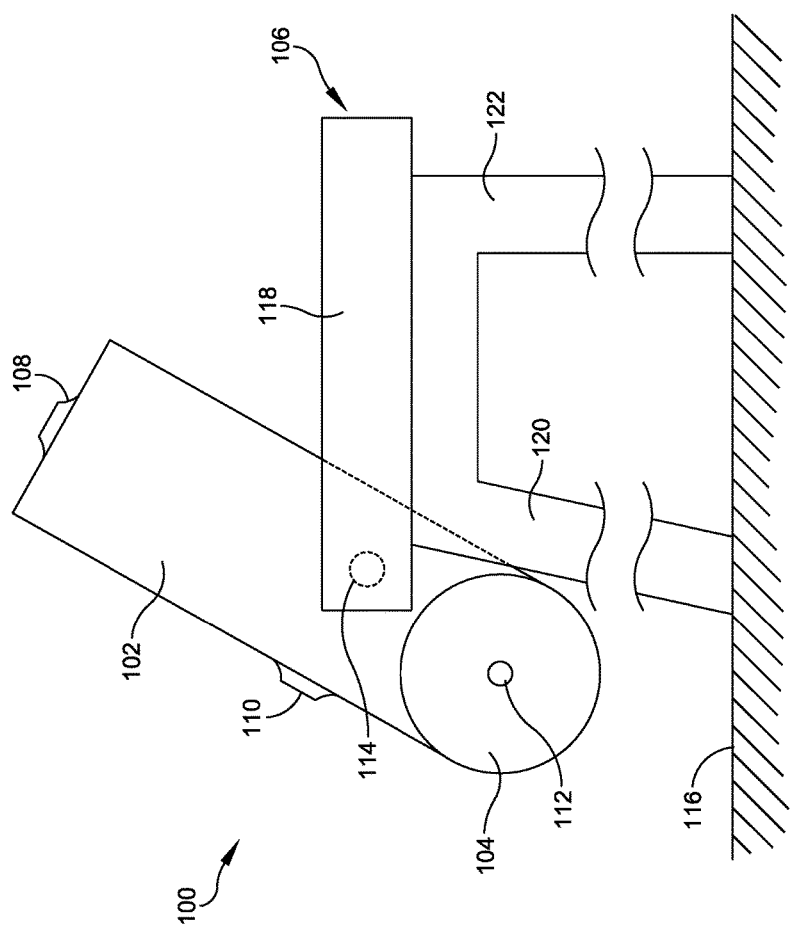
FIG. 2 is a side view of the first embodiment of the TPG.

Aspects of the present disclosure are directed to novel Tidal Power Generators ("TPGs"). These TPGs may provide, for example, improved performance over existing approaches while reducing cost, complexity, and construction time. It is to be appreciated that examples of the methods and apparatus discussed herein are not limited in application to the details of construction and the arrangement of components set forth in the following description or illustrated in the accompanying drawings. The methods and apparatus are capable of implementation in other examples and of being practiced or of being carried out in various ways. Examples of specific implementations are provided herein for illustrative purposes only and are not intended to be limiting.

Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

As will be discussed in greater detail below, at least one embodiment of the disclosure is generally directed to a TPG composed of two or more transversely-coupled containers, each configured to hold a volume of a fluid and configured to be rotatably coupled to a fixed frame disposed in a fluid having a variable fluid level. At a highest fluid level, the containers are each configured to be filled, either partially or completely, with the fluid in which the frame is disposed. As the fluid level subsequently becomes lower, the containers rotate about the frame until a lowest fluid level is reached, at which point the containers will have rotated to an approximately oblique angle relative to the position of the containers at the highest fluid level. The rotation of the containers elevates at least one of the containers above the fluid level, and water head pressure accumulated in the elevated container(s) drives fluid out of the at least one container. In one embodiment, the fluid is driven through a generator configured to generate electrical energy. The process is thereafter repeated to continuously and cyclically generate electrical energy.

Referring now to the drawings, FIG. 1A illustrates a frontal view of a Tidal Power Generator ("TPG") generally indicated at 100, which addresses at least some of the deficiencies described above. FIG. 1B illustrates a perspective view of the same embodiment of the TPG 100 from an alternate angle. In the illustrated embodiment, the TPG 100 includes a first container 102 to hold a first volume of a fluid, a second container 104 to hold a second volume of a fluid, and a frame 106, supported by a crossbeam 130, to support the first container 102 and the second container 104. In the embodiment illustrated by FIGS. 1A and 1B, the first container 102 and the second container 104 are connected at an approximately-oblique angle such that they form a "T" shape. The first container 102 includes an inlet valve 108 configured to selectively control ingress of a fluid into the first container 102 and an outlet valve 110 configured to selectively control egress of the fluid out of the first container 102. The second container 104 includes one or more valves 112 configured to selectively control ingress and egress of a fluid into and out of the container 104. The inlet valve 108 and the one or more valves 112 are constructed of a corrosion-resistant material or materials, and can be actuated electrically, hydraulically, pneumatically, manually, via a cable, via float controls, and so forth.

The first container 102 is physically coupled to the second container 104 at a substantially oblique angle in the illustrated embodiment. In some embodiments, the first container 102 and the second container 104 are fluidically decoupled from each other such that fluid contained in one of the containers 102, 104 may not enter the other container 104, 102, while in other embodiments, the first container 102 and the second container 104 are fluidically coupled to each other such that fluid contained in one of the containers 102, 104 may enter the other container 104, 102.

The first container 102 and the second container 104 are pivotably supported on the frame 106 via a shaft 114. In the embodiment illustrated by FIGS. 1A and 1B, the shaft 114 passes through, and is coupled to, the first container 102 such that the first container 102 and the second container 104 are able to rotate about an axis of the shaft 114 as the shaft 114 rotates. A fluid-tight seal is formed around the perimeter of the shaft 114 such that fluid is not able to pass into, or out of, the first container 102 where the shaft 114 penetrates the first container 102. The frame 106 is configured to be coupled to a fixed plane 116, such as an ocean floor, a barge, a dock, a river bed, a lake floor, a water facility floor, and so forth.

In at least one embodiment, the first container 102 and the second container 104 are each configured to be formed in substantially cylindrical shapes. However, it is to be understood that the containers 102, 104 may be formed in substantially any shape provided that the principals of operation are preserved, as will be discussed in greater detail below.

FIG. 2 illustrates a side view of the TPG 100. FIG. 2 provides additional detail of the frame 106, which includes a shaft support member 118, a first leg 120, and a second leg 122. The shaft support member 118 is configured to support the shaft 114 while remaining rotatably decoupled from the shaft 114, such that the shaft support member 118 remains fixed relative to the fixed plane 116 and the shaft 114 is allowed to rotate about the axis of the shaft 114. For example, in the illustrated embodiment the shaft 114 is configured to extend along, and rotate about, the z-axis in the Cartesian coordinate system, as will be understood by one of ordinary skill in the art. Accordingly, the TPG 100 attached thereto is capable of rotating in either one of a first direction (e.g., a clockwise direction) or a second, opposite direction (e.g., a counterclockwise direction).

As illustrated by FIGS. 1A, 1B, and 2, the first leg 120 and the second leg 122 are coupled to the shaft support member 118 and are configured to be coupled to the fixed plane 116. The dimensions of the first leg 120 and the second leg 122 have been truncated in FIGS. 1A and 2 to illustrate the variability of the length of the first leg 120 and the second leg 122. Furthermore, the first leg 120 and the second leg 122 may be very long compared to the other elements of the TPG 100 (e.g., the first container 102, the second container 104, the shaft support member 118, etc.) such that truncation is necessary for purposes of illustrative clarity, although the precise dimensions of the first leg 120 and the second leg 122 vary as a function of the depth of the fluid in which the TPG 100 is disposed.

In some embodiments, the first leg 120 is configured to contact the fixed plane 116 at an angle that is not normal to the fixed plane 116, such that a single vector normal to the fixed plane 116 does not concurrently intersect the center of the shaft 114 and a center of mass of the second container 104 regardless of the level of the fluid in which the TPG 100 is disposed. Stated differently, the center of mass of the second container 104 is never directly below the shaft 114. Accordingly, a force (e.g., a buoyant force) applied to the center of mass of the second container 104 that is normal to the fixed plane 116 will generate a moment about the shaft 114 regardless of the level of the fluid in which the TPG 100 is disposed. In alternate embodiments, the first leg 120 is configured to contact the fixed plane 116 at an angle normal to the fixed plane 116, and the frame 106 can be designed with alternate features that allow a moment to be generated about the shaft 114 over a complete range of fluid levels. For example, the height of the frame 106 relative to the fixed plane 116 may be such that, even at a lowest fluid level of the fluid in which the TPG 100 is disposed, the TPG 100 does not rotate to an orientation in which a vector normal to the fixed plane 116 concurrently intersects the center of mass of the second container 104 and the shaft 114.

Operation of the TPG 100 will now be described with respect to FIGS. 3, 4A, and 4B. For illustration purposes, in the following example(s) the TPG 100 will be described as being disposed in a body of a fluid that is subject to substantially constant variation, such that the fluid level thereof is cyclically variable between a lowest point and a highest point (e.g., a tidal cycle, etc.). However, it is to be understood that the principles of operation of the TPG 100 may be preserved in alternate situations, as discussed in greater detail below.

Figure 3:
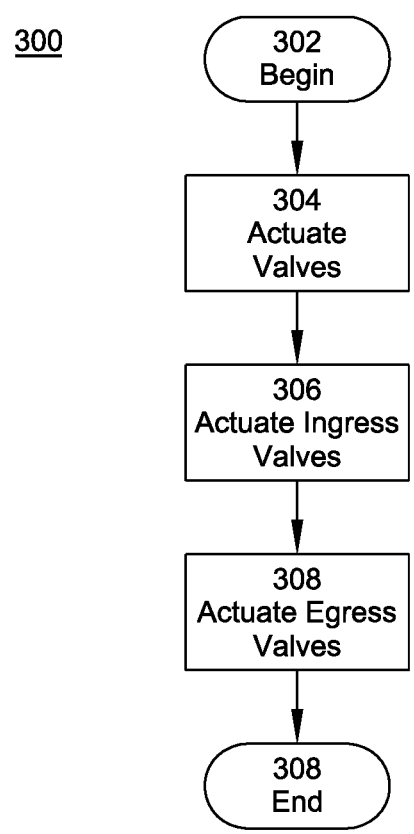
FIG. 3 is a process of actuating one or more valves.
Figure 4A:
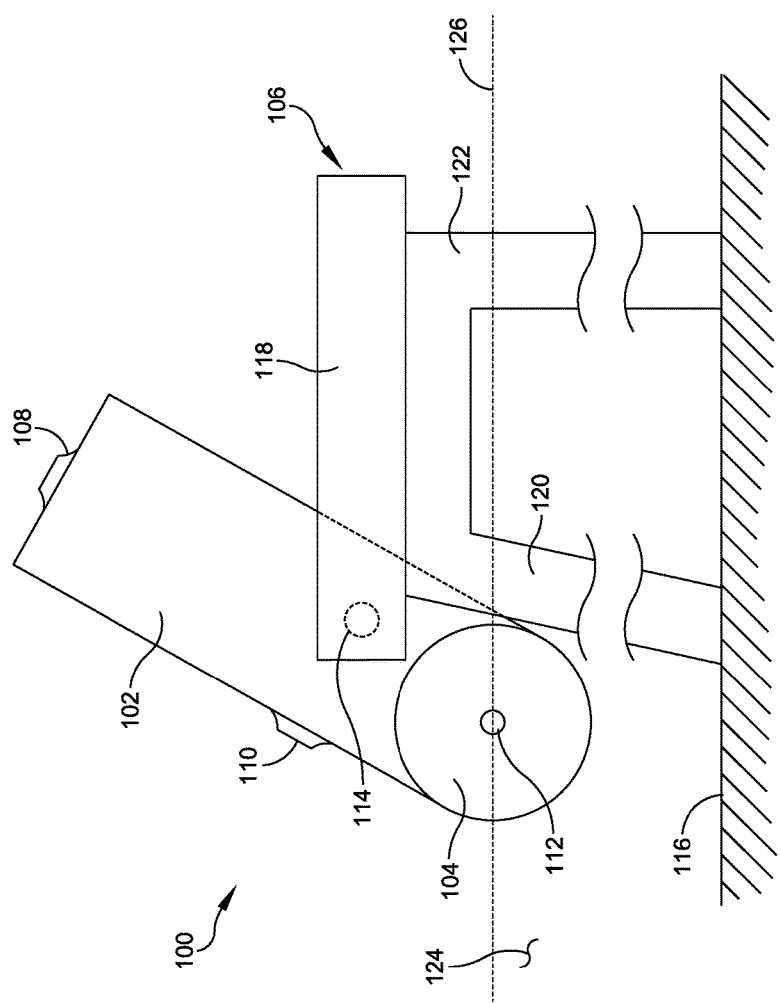
FIG. 4A is a side view of the first embodiment of the TPG in a low fluid level situation.

FIG. 3 illustrates a process 300 of operating one or more valves of a tidal power generator. The process 300 includes acts of actuating (e.g., opening, closing, opening and closing, etc.) a first set of valves configured to allow the exchange of a fluid in a container, actuating a second set of valves configured to allow ingress of the fluid into a container, and actuating a third set of valves configured to allow egress of the fluid out of a container.

At act 302, the process 300 begins. At act 304, one or more valves are actuated by opening the one or more valves to allow a fluid to enter or exit a container, and subsequently closing the one or more valves when a desired amount of the fluid has entered or exited the container. For example, the one or more valves 112 may be actuated to allow a fluid to enter or exit the second container 104. The act 304 may be executed responsive to the fluid being at a lowest fluid level, a highest fluid level, or a fluid level that is neither the highest fluid level nor the lowest fluid level. In alternate embodiments, the act 304 may be executed responsive to the TPG 100 rotating to a specific angle.

At act 306, one or more ingress valves are actuated to allow a fluid to enter a container. For example, the inlet valve 108 can be opened to allow a fluid to enter the first container 102 responsive to the fluid being at a highest fluid level, such as a high tide level, which may be measured directly by a fluid level sensor or may be extrapolated from a sensed angle to which the TPG 100 has rotated. The inlet valve 108 can be subsequently closed when a desired amount of the fluid has entered the first container 102. At act 308, one or more egress valves are actuated to allow a fluid to exit the container. For example, the outlet valve 110 may be opened to allow fluid stored in the first container 102 to exit the first container 102 for the purpose, in one embodiment, of driving an electrical generator, as will be discussed in greater detail below. The outlet valve 110 may be subsequently closed when a desired amount of the fluid has exited the first container 102. The act 308 may be actuated responsive to the fluid being at a lowest fluid level, such as a low tide level, which may be measured directly by a fluid level sensor or may be extrapolated from a sensed angle to which the TPG 100 has rotated. For example, the TPG 100 at act 308 may be substantially oblique from the TPG 100 at act 306, the substantially oblique angle being the largest angle between the TPG 100 at any two points in time. At act 310, the process 300 ends.

Examples of the process 300 will now be described with specific reference to FIGS. 4A and 4B. FIG. 4A illustrates the TPG 100 disposed in a fluid 124 at a lowest fluid level 126 at a first time of a complete cycle. At the first time, the first container 102 is not full (e.g., not full of the fluid 124), and the second container 104 is full in the given example. However, in alternate embodiments the second container 104 may not be full at the first time. If the second container 104 is not full, the one or more valves 112 may be opened at act 304 to allow the fluid 124 to enter the second container 104. The second container 104 may be completely filled with the fluid 124, or may contain a volume occupied by the fluid 124 and a volume or regions that are occupied by other fluids (e.g., air), a vacuum, a combination of both, and so forth. In other embodiments, the one or more valves 112 may be opened to allow the fluid 124 to exit the second container 104, and the second container 104 may be partially or completely emptied at the act 304. The one or more valves 112 may be subsequently closed responsive to a desired amount of the fluid 124 entering or exiting the second container 104.

The second container 104 is constructed of a material, or materials, that allow the second container 104 to float in the fluid 124. For example, if the second container 104 is configured to be disposed in seawater and is filled completely with seawater, then the second container 104 will be constructed of material(s) having a composite density that is less than the seawater in which the second container 104 is disposed. Accordingly, and with specific reference to the spatial relationships depicted in FIG. 4A, the first container 102 and the second container 104 experience a clockwise moment about the shaft 114 as the level of the fluid 124 rises, caused by an upward buoyant force exerted on the floating second container 104. The level of the fluid 124 will continue to rise until a highest fluid level is reached.

FIG. 4B illustrates the TPG 100 disposed in a fluid 124 at a highest fluid level 128 at a second time. At the second time, the inlet valve 108 is at least partially submerged in the fluid 124 such that, as the inlet valve 108 is opened at the act 306, the fluid 124 enters the first container 102. In some embodiments, the fluid 124 may completely fill the first container 102, while in alternate embodiments, the fluid 124 may not completely fill the first container 102. The inlet valve 108 is closed responsive to a desired amount of the fluid 124 entering the first container 102.

As the level of the fluid 124 begins to lower after the second time, and with continued reference to the spatial relationships depicted in FIG. 4B, the first container 102 and the second container 104 are configured to rotate counterclockwise. Accordingly, a counterclockwise moment about the shaft 114 created by the weight of the second container 104 and a portion of the first container 102 between the second container 104 and the shaft 114 is greater than a clockwise moment about the shaft 114 created by the weight of the inlet valve 108, the outlet valve 110, and a portion of the first container 102 between the shaft 114 and the inlet valve 108 in the embodiment illustrated by FIG. 4B. The first container 102 and the second container 104 continue to rotate in a counterclockwise orientation until the level of the fluid 124 returns to the lowest fluid level 126 at a third time.

The TPG 100 at the third time is substantially identical to the TPG 100 at the first time, except that the first container 102 contains more of the fluid 124 at the third time than at the first time. Specifically, at the third time the first container 102 contains fluid having a fluid level that is not completely below the outlet valve 110. Accordingly, the fluid contained in the first container 102 that is above the bottom of the outlet valve 110 experiences a water pressure head that will drive the fluid out of the outlet valve 110 when the outlet valve 110 is opened (e.g., at the act 308).

The outlet valve 110 may be connected to one or more generators, which may be internal or external to the TPG 100, by a vessel configured to transport a fluid (e.g., a pipe, a tube, etc.) at the third time, or may already have been connected to the generator prior to the third time. The outlet valve 110 is configured to be opened at the third time, thereby allowing fluid to be released from the first container 102 and provided to the generator via the vessel, the generator being configured to generate electrical energy from a fluid flow. In some embodiments, the outlet valve 110 may be configured to remain open until the fluid level of the fluid contained in the first container 102 is below the outlet valve 110, while in other embodiments, the outlet valve 110 may be closed responsive to an alternate condition, such as a specified time having elapsed or a specified volume of the fluid exiting the first container 102.

Although the inlet valve 108 is depicted as being positioned approximately along the axis of the first container 102, it is to be understood that the inlet valve 108 may be positioned anywhere on the first container 102 such that the inlet valve 108 is at least partially submerged in the fluid 124 at the highest fluid level 128. Furthermore, although the highest fluid level 128 has been depicted as roughly bisecting the first container 102 and the second container 104, it is to be understood that alternate embodiments are contemplated. For example, in some embodiments, the TPG 100 may be completely submerged in the fluid in which the TPG 100 is disposed when the fluid 124 is at a highest fluid level 128. With continued reference to FIG. 4B, the TPG 100 can be designed such that the highest fluid level 128 may reach a wide range of positions relative to the TPG 100 provided that the inlet valve 108 is at least partially submerged at the highest fluid level 128. Similarly, the outlet valve 110 may be positioned in one of many locations provided that the outlet valve 110 is above the lowest fluid level 126.

In at least one embodiment, the cycle ends when the outlet valve 110 is closed at a fourth time and the cycle repeats from the first time. TABLE 1 summarizes the state of the TPG 100 over a complete cycle, as the term is understood in light of the foregoing example, although it is to be understood that the TPG 100 may assume alternate states in alternate examples.

TABLE 1

|  | Fluid Level | First Container State | Second Container State |
| --- | --- | --- | --- |
| First Time | Lowest | Empty | Full |
| Second Time | Highest | Full | Full |
| Third Time | Lowest | Full | Full |
| Fourth Time | Lowest | Empty | Full |

Although the foregoing example(s) have been directed to a substantially constant tidal cycle, it is to be understood that the TPG 100 may be operated in any body of fluid having a fluid level that is not indefinitely constant. For example, the TPG 100 can be disposed in one or more of a river supported by a river lock system (e.g., one capable of raising and lowering water levels), a pond or lake supported by a reservoir or dam (e.g., one capable of raising and lowering water levels), a water storage facility, and so forth. The fluid level may vary naturally or artificially, and may vary periodically or aperiodically. The fluid level may vary between two substantially identical points in some examples, while in others, the fluid level may vary between a wide range of fluid levels.

As discussed above, the second container 104 may be composed of a material having a density less than that of the fluid in which the TPG 100 is disposed. However, in alternate embodiments, the second container 104 may be composed of a material having a density that is greater than the fluid in which it is disposed provided that the second container 104 floats in the fluid. For example, the second container 104 may contain fluid(s), material(s), and so forth, having a density that is less than the fluid in which the second container 104 is disposed, or may contain a vacuum, such that the second container 104 is able to float in the fluid. Similarly, the first container 102 may be composed of a material or materials having a composite density that may be greater than or less than the fluid in which the TPG 100 is disposed, provided that the first container 102 is capable of rotating to an angle at which the fluid may enter the first container 102.

Although certain illustrated embodiments may depict the first container 102 and the second container 104 as being composed of a rigid material, it is to be understood that the first container 102 and the second container 104 may be composed of a rigid material, a flexible material, or a combination of both. The shape of the containers 102, 104 is similarly not limited by examples given herein, and it is to be understood that the containers 102, 104 can assume a variety of different shapes provided that the principles of operation of the TPG 100, such as the application of appropriate moments, are preserved.

In addition to shapes of the containers 102, 104, other design factors including the material of which the first container 102 is composed, the material of which the second container 104 is composed, the position of the shaft 114, the amount of fluid allowed to enter each of the first container 102 and the second container 104, and so forth, may be selected such that appropriate moments (e.g., a clockwise moment, a counterclockwise moment, etc.) are applied to the first container 102 and the second container 104 over appropriate intervals (e.g., while the fluid level is rising, while the fluid level is falling, etc.).

Furthermore, the frame 106 can include sliding, adjustable supports operable to accommodate fluid level variations caused by, for example, seasonal changes, weather-induced tidal fluctuations, and so forth. The TPG 100 can further include one or more devices configured to operate the TPG 100 for extended periods of time. For example, the TPG 100 can include at least one locking system to maintain the position of the first container 102 in a highest position, while the second container 104 remains in a lowest position, to further extend the electrical generation period of the TPG 100, independent of any tidal changes of the fluid in which the TPG 100 is disposed. The locking system may work in concert with a process of increasing the amount of fluid entered into the second container 104 through the one or more valves 112 to increase the weight of the second container 104 (e.g., to increase the buoyant force exerted on the second container 104).

The TPG 100 can further include one or more devices configured to operate the TPG 100 in extreme cold weather conditions, including one or more heating elements, one or more fluid vibration devices, and insulation coupled to the TPG 100. The TPG 100 can further include one or more devices configured to operate the TPG 100 in extreme hot weather conditions, including, for example, one or more pressure relief valves, one or more cooling devices, and a solar reflective material or coating coupled to the TPG 100. In some embodiments, a screened water inlet may be coupled to the valves 108, 112 to prevent unwanted materials (e.g., animal life, plant life, etc.) in the fluid surrounding the valves 108, 112 from entering the first container 102 and the second container 104. In further embodiments, air vents may be coupled to either or both of the first container 102 and the second container 104 to allow air to be released while filling or emptying the first container 102 and the second container 104. Furthermore, in some embodiments, the release of fluid contained within the second container 104 can be harnessed to generate electricity in a fashion similar to the method by which electricity is generated by the release of fluid contained in the first container 102.

Although the first container 102 is illustrated as having a single inlet valve 108 capable of selectively controlling ingress of a fluid into the first container 102, in alternate embodiments, the inlet valve 108 may be supplemented with or supplanted by an open inlet configured to freely allow a fluid to enter the first container 102. Furthermore, the inlet valve 108 may be supplemented with or supplanted by one or more valves capable of controlling ingress of a fluid, egress of a fluid, or both, into or out of the first container 102.

Figure 5:
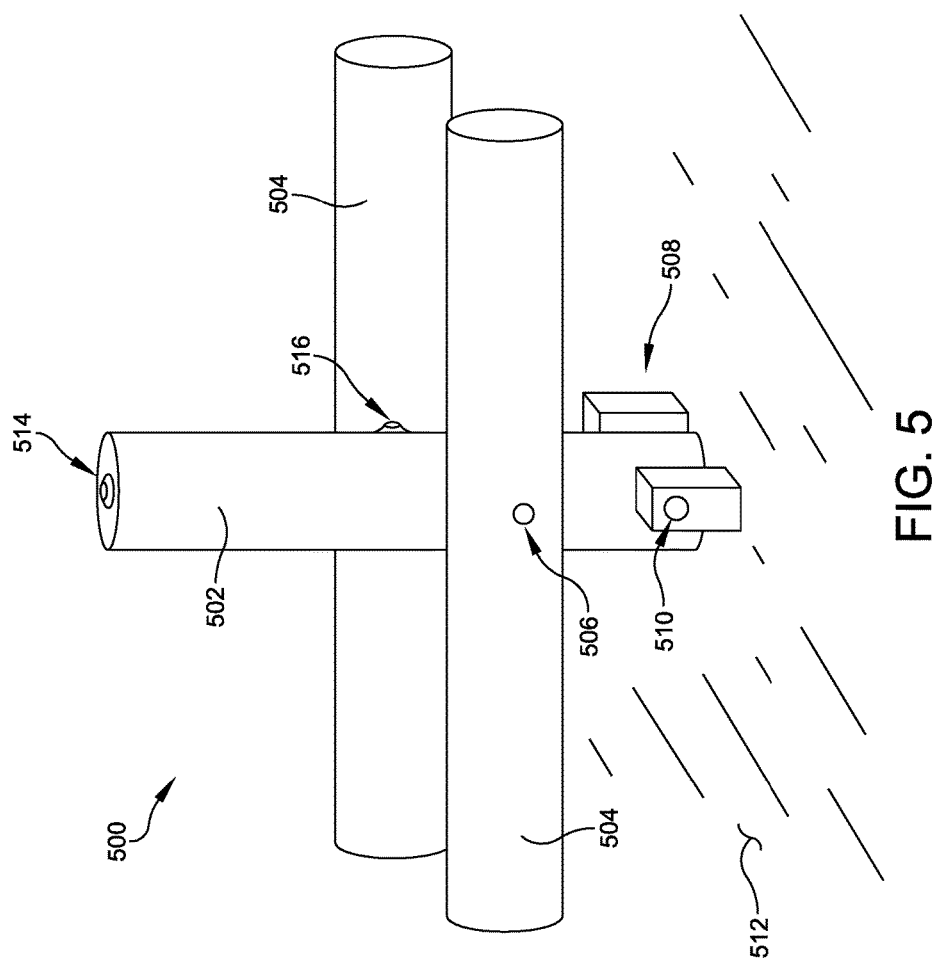
FIG. 5 is a perspective view of a second embodiment of a TPG.

FIG. 5 illustrates an alternate implementation of a TPG, which is generally indicated at 500. The TPG 500 includes a first container 502 pivotably coupled to one or more second containers 504 about a first shaft 506. The first container 502 is further pivotably coupled to a frame 508 about a second shaft 510, the frame 508 being secured to or otherwise resting on a fixed plane 512, such as an ocean floor, a barge, a dock, and so forth. The first container 502 includes at least one valve 514 through which a fluid (e.g., ocean water) is permitted to flow into the first container 502, and one or more outlet valves 516 through which a fluid is permitted to flow out of the first container 502.

In at least one embodiment, the second containers 504 are sealed containers containing at least one fluid (e.g., air). The at least one fluid may be a fluid having a density less than that of a fluid in which the TPG 500 is disposed, and a buoyant force may be exerted on the second containers 504 sufficient to, for example, allow the second containers 504 to float on the fluid in which the TPG 500 is disposed, as described in more detail below with respect to FIGS. 6 and 7.

Figure 6:
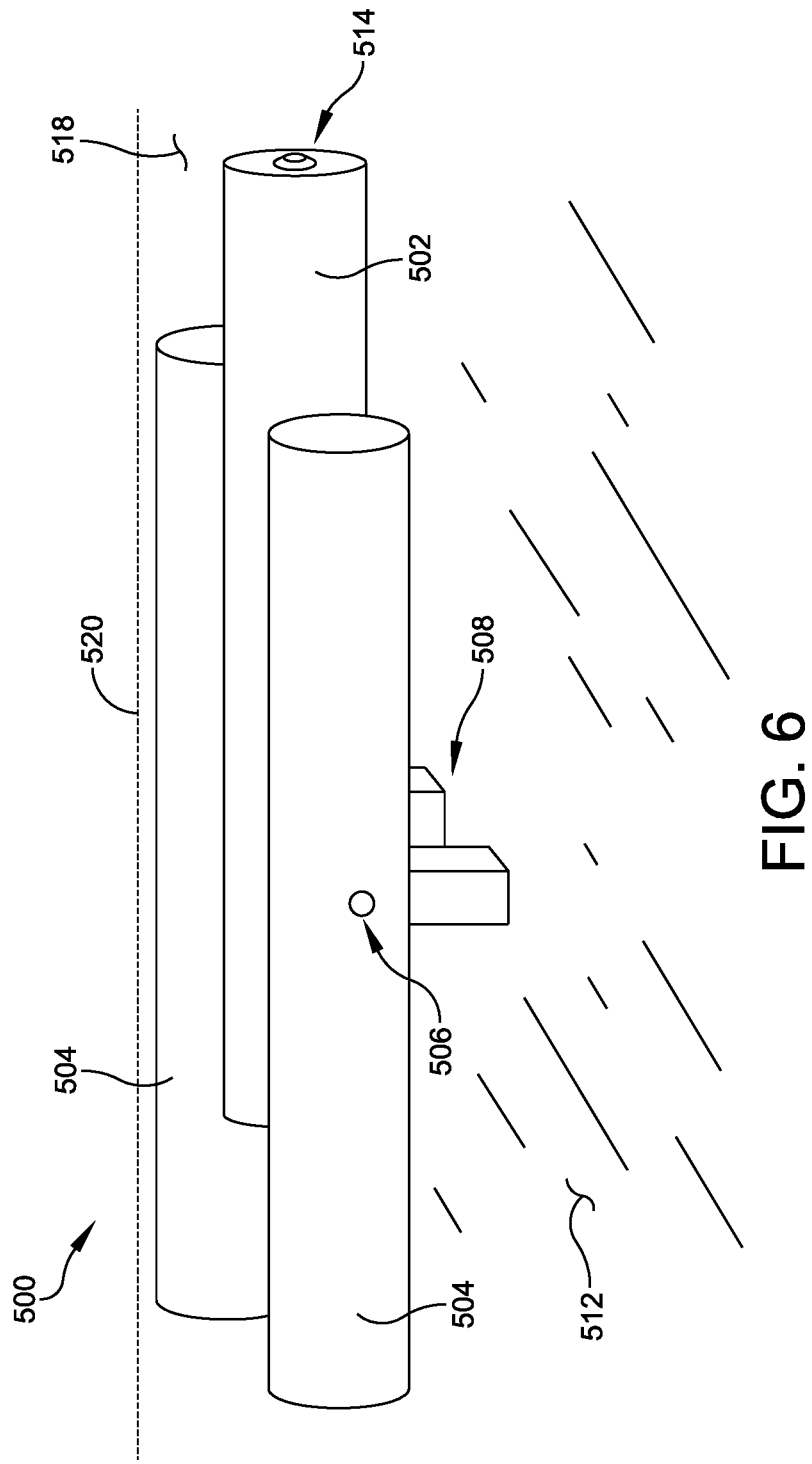
FIG. 6 is a perspective view of the second embodiment of the TPG in a low tide situation.

FIG. 6 illustrates a perspective view of the TPG 500 disposed in a fluid 518 at a lowest fluid level 520. As shown, the valve 514 is at least partially below the lowest fluid level 520. In some embodiments, the valve 514 is open, allowing a portion of the fluid 518 to flow into the first container 502 until the first container 502 is filled with a desired amount of the fluid 518, at which point the valve 514 is closed.

Figure 7:
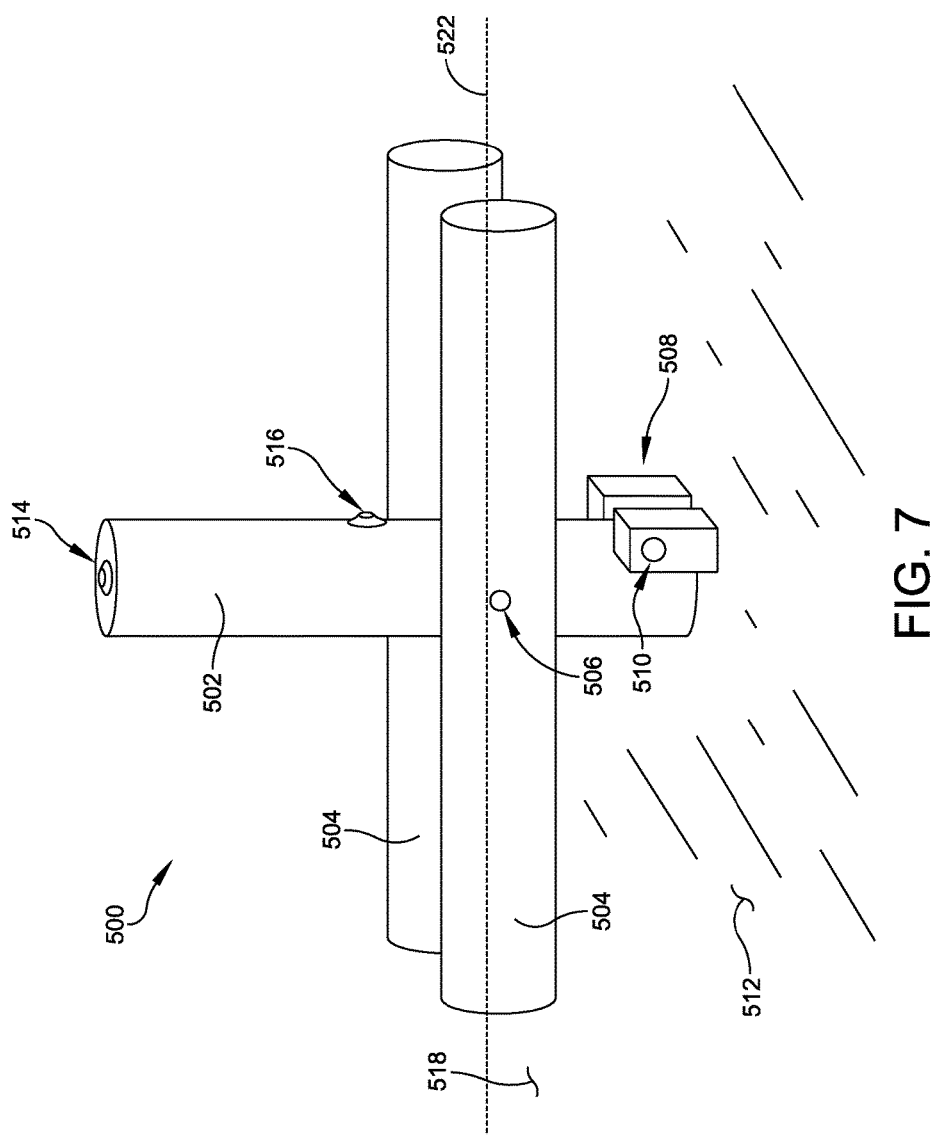
FIG. 7 is a perspective view of the second embodiment of the TPG in a high tide situation.

FIG. 7 illustrates a side view of the TPG 500 disposed in the fluid 518 at a highest fluid level 522. As illustrated in FIG. 7, the buoyant force exerted on the second containers 504 is sufficient to cause the first container 502 and the second containers 504 to ascend with the fluid 518. Responsive to the first container 502 reaching a highest position, the one or more outlet valves 516 are opened, allowing at least some of the fluid stored in the first container 502 to be released from the first container 502. The fluid may, for example, be released into one or more turbines, which are operable to drive one or more electric generators to produce electrical energy. In some embodiments, the turbines and the electric generators are located internally to the TPG 500, while in others, the turbines and the electric generators are located externally to the TPG 500.

The fluid flowing from the first container 502 into the turbine(s) is under high pressure due to accumulated water head pressure within the first container 502 as discussed above with respect to the TPG 100. The generators, accordingly, are provided power from a release of fluid from the first container 502, and the generators are operable to generate electricity for an extended period of time. When the fluid level in the first container 502 reaches a desired minimum level, the valves 516 are closed, and the turbines and the generators cease operation.

As discussed above, the TPG 500 can be disposed in a variety of fluid bodies other than the ocean including, for example, a river supported by a river lock system (e.g., one capable of raising and lowering water levels), a pond or lake supported by a reservoir or dam (e.g., one capable of raising and lowering water levels), or in a water storage facility.

In some embodiments, a screened water inlet may be coupled to the at least one valve 514 to prevent unwanted materials (e.g., animal life, plant life, etc.) in the surrounding fluid in which the TPG 500 is disposed from entering into the first container 502. In further embodiments, air vents may be coupled to the first containers 502 to allow air to be released while filling or emptying the first container 502. Furthermore, in some embodiments, the release of fluid contained within the second containers 504 can be harnessed to generate electricity in a fashion similar to the method by which electricity is generated by the release of fluid contained within the first container 502.

Although certain illustrated embodiments may depict the first container 502 and the second containers 504 as being composed of a rigid material, it is to be understood that the first container 502 and the second containers 504 may be composed of a rigid material, a flexible material, or a combination of both. The shape of the containers 502, 504 is similarly not limited by examples given herein, and it is to be understood that the containers 502, 504 can assume a variety of different shapes. Furthermore, the frame 508 can include sliding, adjustable supports operable to accommodate, for example, tide level variations caused by seasonal changes, weather-induced tidal fluctuations, and so forth.

The TPG 500 can further include one or more devices configured to operate the TPG 500 for extended periods of time. For example, the TPG 500 can include at least one locking system to maintain the position of container 502 in a highest position, while the second containers 504 also maintain a highest position, to further extend the electrical generation period of the TPG 500, independent of any tidal changes of the fluid in which the TPG 500 is disposed.

The TPG 500 can further include one or more devices configured to operate the TPG 500 in extreme cold weather conditions, including, for example, one or more heating elements, one or more fluid vibration devices, and insulation coupled to the TPG 500.

The TPG 500 can further include one or more devices configured to operate the TPG 500 in extreme hot weather conditions, including, for example, one or more pressure relief valves, one or more cooling devices, and a solar reflective material or coating coupled to the TPG 500.

Figure 8:
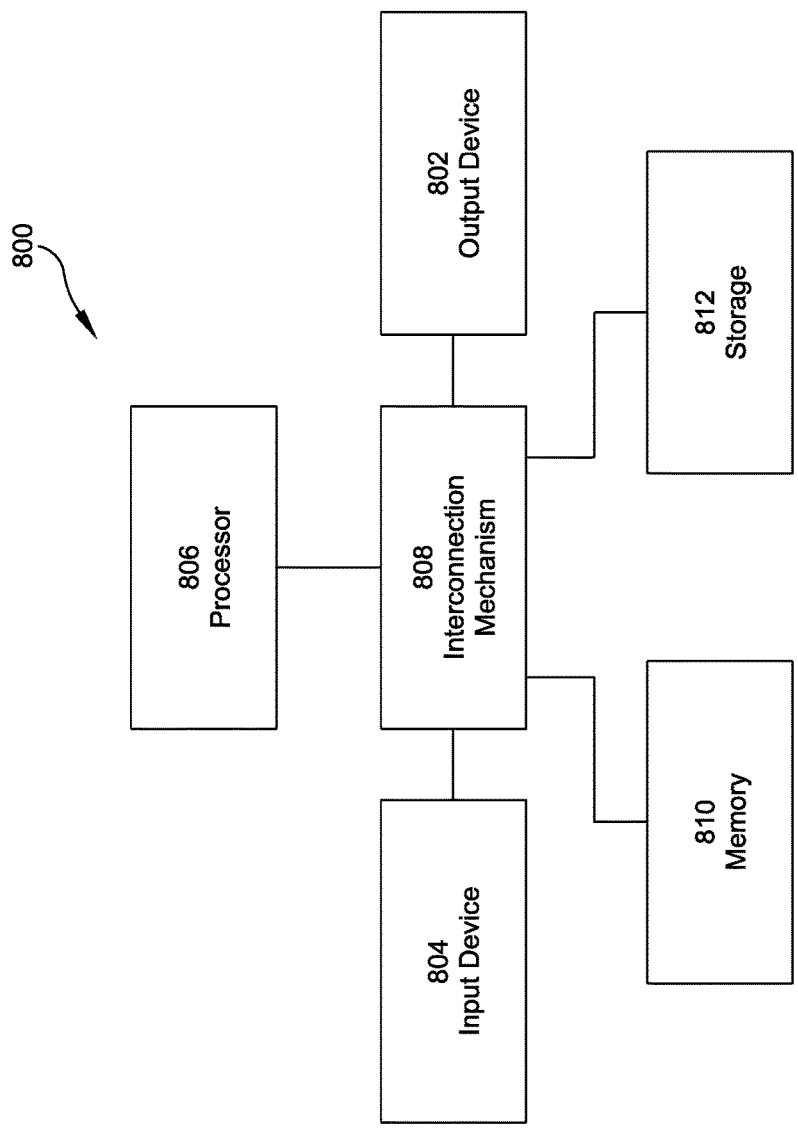
FIG. 8 is a block diagram of a system configured to operate a TPG.

FIG. 8 illustrates an example block diagram of computing components forming a system 800 which may be configured to implement one or more aspects disclosed herein. The system 800 includes an output device 802, an input device 804, a processor 806, a memory 810, and a storage element 812 communicatively coupled together by an interconnection mechanism 808. The input device 804 is operable to communicate information to elements of the system 800 via the interconnection mechanism 808. For example, the processor 806 may receive information from the input device 804 on which to execute programs stored in the memory 810 and the storage element 812. The output device 802 is operable to provide data from the system 800 to devices external to the system 800.

Having thus described several aspects of at least one embodiment, it is to be appreciated various alterations, modifications, and improvements will readily occur to those skilled in the art. Such alterations, modifications, and improvements are intended to be part of this disclosure, and are intended to be within the scope of the disclosure. Accordingly, the foregoing description and drawings are by way of example only.

What is claimed is:

1. A tidal power generator comprising:
a first container;
a second container coupled to the first container;
a frame pivotably coupled to the second container;
one or more electrical generators;
a first valve, associated with the second container, configured to selectively control ingress of a first volume of a fluid into the second container;
a second valve, associated with the second container, configured to selectively control egress of a second volume of the fluid out of the second container; and
a third valve, associated with the first container, configured to selectively control ingress and egress of a third volume of the fluid into and out of the first container and to provide at least a portion of the third volume of the fluid to the one or more electrical generators on egress of the third volume of the fluid,
wherein the first container is fluidically decoupled from the second container.

2. The tidal power generator of claim 1, wherein the second container is coupled transversely to the first container.

3. The tidal power generator of claim 1, wherein the tidal power generator is disposed in a body of the fluid, the body of the fluid having a high fluid level and a low fluid level.

4. The tidal power generator of claim 3, wherein the tidal power generator is configured to raise the first volume of the fluid above the high fluid level.

5. The tidal power generator of claim 1, wherein the second volume of the fluid is provided to the one or more electrical generators to drive the one or more electrical generators.

6. The tidal power generator of claim 1, wherein the frame is configured to be coupled to a fixed plane.

\* \* \* \* \*